US010601493B2

(12) United States Patent
Josefiak

(10) Patent No.: US 10,601,493 B2
(45) Date of Patent: Mar. 24, 2020

(54) DISADVANTAGED NODE DISCOVERY

(71) Applicant: Precision Optical Transceivers Inc., Rochester, NY (US)

(72) Inventor: Brent Josefiak, Rochester, NY (US)

(73) Assignee: PRECISION OPTICAL TRANSCEIVERS INC., Rochester, NY (US)

( * ) Notice: Subject to any disclaimer, the term of this patent is extended or adjusted under 35 U.S.C. 154(b) by 127 days.

(21) Appl. No.: 15/904,101

(22) Filed: Feb. 23, 2018

(65) Prior Publication Data
US 2019/0268062 A1 Aug. 29, 2019

(51) Int. Cl.
H04B 7/08 (2006.01)
H04W 8/00 (2009.01)
H04B 7/06 (2006.01)

(52) U.S. Cl.
CPC ......... H04B 7/0857 (2013.01); H04B 7/0617 (2013.01); H04B 7/086 (2013.01); H04W 8/005 (2013.01)

(58) Field of Classification Search
CPC .. H04B 7/0617; H04B 17/318; H04B 7/0695; H04B 7/0408; H04B 7/086; H04B 7/088; H04B 7/0608; H04B 7/08; H04B 7/005; H04B 7/0802; H04W 64/00; H04W 4/029; H04W 16/28; G01S 5/06
See application file for complete search history.

(56) References Cited

U.S. PATENT DOCUMENTS

| 6,353,601 | B1* | 3/2002 | Siira | H04W 64/00 370/331 |
| 9,871,570 | B1* | 1/2018 | Kerhuel | H04B 7/0617 |
| 10,181,972 | B1* | 1/2019 | Giallorenzi | H04L 47/225 |
| 2004/0157645 | A1* | 8/2004 | Smith | H01Q 1/246 455/562.1 |
| 2005/0062643 | A1* | 3/2005 | Pande | G01S 5/0027 342/357.64 |
| 2006/0194587 | A1* | 8/2006 | Sharony | H04W 4/029 455/456.1 |
| 2010/0151865 | A1* | 6/2010 | Camp, Jr. | H04W 72/046 455/445 |
| 2011/0201357 | A1* | 8/2011 | Garrett | G01S 5/0252 455/456.2 |

(Continued)

FOREIGN PATENT DOCUMENTS

WO 2010052519 A1 5/2010
WO 2015171248 A1 11/2015

Primary Examiner — Wutchung Chu
(74) Attorney, Agent, or Firm — Fox Rothschild LLP; Robert J. Sacco

(57) ABSTRACT

Method for discovering the presence of a communication node which seeks participation in a radio communication network. The method involves receiving with a first directional antenna a first signal from a late entrant node (LEN) concurrent with a radio network communication session (RNCS). Digital data processing gain is applied to the first signal to facilitate detection of a digital data sequence. A time difference of arrival (TDOA) analysis is performed if the digital data sequence transmitted from the late entrant node is also detected in a second signal contemporaneously received at a second directional antenna. The TDOA analysis is used to estimate at least one beam-steering vector.

18 Claims, 6 Drawing Sheets

(56) References Cited

U.S. PATENT DOCUMENTS

| | | | | |
|---|---|---|---|---|
| 2013/0315321 | A1* | 11/2013 | Rajagopal | H04L 27/2607 375/260 |
| 2014/0362744 | A1* | 12/2014 | Yan | H04B 7/26 370/280 |
| 2015/0036726 | A1* | 2/2015 | Pajona | H04B 7/043 375/219 |
| 2015/0257121 | A1* | 9/2015 | Siomina | H04W 64/003 455/456.6 |
| 2016/0202344 | A1* | 7/2016 | Sanderovich | G01S 5/06 455/456.1 |
| 2017/0207839 | A1* | 7/2017 | Eitan | H04B 7/0617 |
| 2017/0250831 | A1* | 8/2017 | Aldana | H04W 4/029 |
| 2018/0317042 | A1* | 11/2018 | Kasher | H04W 64/006 |
| 2019/0053013 | A1* | 2/2019 | Markhovsky | G01S 5/10 |
| 2019/0199457 | A1* | 6/2019 | Chopra | H04B 17/309 |
| 2019/0261137 | A1* | 8/2019 | Markhovsky | H04W 24/10 |
| 2019/0261193 | A1* | 8/2019 | Torsner | H04W 24/10 |

* cited by examiner

DISADVANTAGED NODE DISCOVERY

BACKGROUND

Statement of the Technical Field

The technical field of this disclosure comprises communication networks, and more particularly concerns node discovery in communication networks operating at radio frequencies that experience high path loss.

Description of the Related Art

Radio frequency (RF) communication networks need to establish wireless communication links between nodes which comprise the network. However, in some scenarios it can be difficult to establish such communication links at useful distances due to a high degree of path loss at the selected operating frequency. Path loss refers to the attenuation of electromagnetic waves as they propagate between two nodes of a communication network. Path loss is of particular concern for RF communication networks operating at millimeter wave frequencies (28-300 GHz) due to the high degree of attenuation such signals are known to experience in free space.

The problem of path loss can be partially overcome by using directional antennas which facilitate gain. But in order to have the full benefit of such antennas, the antenna beam must be pointed toward the target node with which communication is desired. If the antenna beam is not precisely aligned with the target node, then the link may not be established. With increasing gain, the beam-width of the antenna becomes more narrow and the alignment problem becomes even more challenging. So directional antennas can provide substantial benefit in systems which suffer high path loss, but they can also make the alignment problem more difficult. So the directional antennas used in a particular radio link often involve a trade-off between the benefits associated with increased gain and the tighter alignment tolerances which must be satisfied when such antennas are used.

For communication links between fixed site nodes, the problem of antenna alignment is conventionally solved by applying mechanical and optical alignment techniques. In many scenarios, the mechanical and optical alignment operations are performed by installation technicians. But installation cost is substantially increased when a technician must manually align antennas between remote antenna towers in order to form an RF link. For systems in which node locations are fixed, these operations can be facilitated to some extent by using accurate location information concerning the particular antenna sites involved in establishing a link. For example, such information can be obtained by means of satellite-enabled positioning systems (e.g., a Global Positioning System or GPS). This information can be helpful to the installation technicians to facilitate the antenna alignment process because it provides a starting point for the antenna alignment process.

For communication links between a fixed site node and one or more mobile target nodes, the antenna beam alignment problem can be more challenging since the location of a target node is often not known in advance. This is a common problem in mobile communication systems that allow for late entry of mobile units into an existing network. In such systems, the time and complexity associated with bringing new nodes into the radio network can be a key performance parameter. But if a directional antenna is in use at a base station, a mobile target node may be in a null portion of the antenna beam. Consequently, it may be difficult or impossible to form an effective communication link with such directional antenna. In such scenarios, an antenna with an omnidirectional radiation pattern may be used to improve the chances of establishing a communication link with a mobile node having an unknown location. Still, an omnidirectional antenna will inevitably have less gain than directional antenna. And this difference in gain will naturally limit the ability of a fixed site node to communicate with mobile nodes. More particularly, nodes that could potentially be reached with a directional beam may not be accessible when an omnidirectional beam pattern is in use. Accordingly, the overall effective range of the communication system will be impaired.

SUMMARY

This document concerns a radio communication network and associated method for discovering the presence of a communication node which seeks participation in the network. The method involves using a first directional antenna associated with a first network node to facilitate a radio network communication session (RNCS) with at least a second network node. The method further involves receiving, concurrent with the RNCS, at the first directional antenna a first signal comprising a digital data sequence transmitted from a late entrant node (LEN) which seeks participation in the radio communication network. Digital data processing gain is applied to the first signal received by the first directional antenna to facilitate detection of the digital data sequence at receive signal strength levels which are below a noise floor of a receiver associated with the first network node. Thereafter, a time difference of arrival (TDOA) analysis is performed if the digital data sequence transmitted from the late entrant node is also detected in a second signal contemporaneously received at a second directional antenna.

Location information associated with the LEN is determined based on the TDOA analysis. The location information is then used to estimate at least one beam-steering vector necessary for electronically steering a boresight of a transmit and receive antenna beam toward the LEN.

The method can further involve accessing dynamically variable state information which specifies first and second antenna gain patterns for the first and second directional antennas at a time which corresponds to the detection time of the digital data sequence in the first and second signals. The first and second antenna gain patterns are compared to determine exclusionary arrival angles from which the first signal cannot have originated under conditions where the digital data sequence transmitted from the late entrant node is only detected in the first signal. In some scenarios, a received signal strength (RSS) information for the first signal is also used to facilitate the determination of the exclusionary arrival angles in accordance with the first and second antenna gain patterns.

Embodiments also concern a radio communication network. The radio communication includes a first network node coupled to a first directional antenna which is configured to facilitate a radio network communication session (RNCS) with at least a second network node. The network also includes a node discovery module (NDM). The node discovery module is comprised of one or more processing elements which carry out the method described herein.

BRIEF DESCRIPTION OF THE DRAWINGS

This disclosure is facilitated by reference to the following drawing figures, in which like numerals represent like items throughout the figures, and in which.

DETAILED DESCRIPTION

Figure 1:
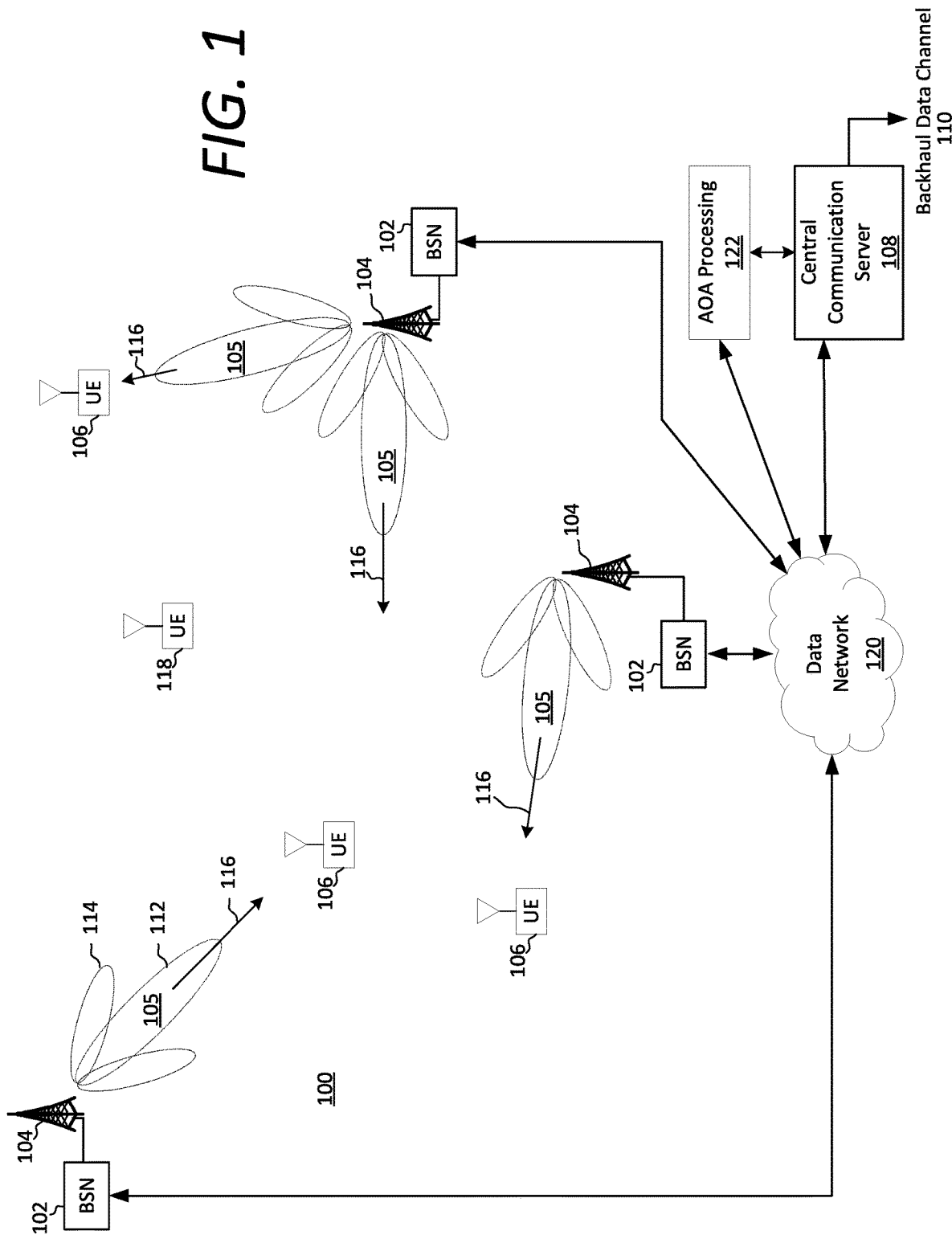
FIG. 1 is a block diagram that is useful for understanding certain aspects of a radio communication network disclosed herein.

It will be readily understood that the components of the systems and/or methods as generally described herein and illustrated in the appended figures could be arranged and designed in a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

The solution disclosed herein provides certain advantages in a communication network. According to one aspect, the performance of such networks is improved by a method and system in which an antenna beam alignment vector is automatically determined for establishing a communication link. According to one aspect, the alignment vector is determined using only directional antennas, and such determination can occur concurrent with ongoing communications which are facilitated by such directional antennas. In this regard, the system avoids reliance upon omnidirectional antennas which are sometimes used for link establishment, and overcomes problems associated with blind spots caused by nulls in the pattern of a directional antenna pattern. Accordingly, the system facilitates continuous detection of new nodes joining the network, even while using high gain, narrow beam antennas. The solution is thus well suited for automatically establishing communication radio links with mobile nodes operating in the millimeter wave range, where the amount of path loss encountered at useful link distances makes link establishment especially difficult. Notably, the system can facilitate such automatic link establishment with mobile network nodes while using millimeter wave radio communications only.

Referring now to FIG. 1 it can be observed that a radio communication network 100 can comprise one or more base station nodes 102 and associated antenna systems 104 which have a fixed and/or known location within a particular geographic area. The base station nodes (BSNs) use directional antennas (such as electronically steered antenna arrays) to direct antenna beams 105 toward locations associated with other nodes which comprise the communication network. As is known, a directional antenna is one which exhibits increased antenna gain in certain directions and decreased gain in other directions to facilitate increased radio link performance. In some scenarios, the directional antennas referred to herein can be high-gain antennas which have a very narrow antenna beam width.

The base station nodes 102 can communicate with one or more mobile user equipment (UE) nodes 106 by establishing radio links. As shown in FIG. 1, an antenna beam associated with a particular directional antenna will commonly include a main lobe 112 aligned along a boresight direction where the antenna has maximum gain, and one or more minor or lesser lobes 114 which have less gain as compared to the main lobe. As shown in FIG. 1, the minor or lesser nodes will be aligned in directions other than the boresight direction.

A BSN 102 and associated antenna system 104 can comprise a single directional antenna establishing a single antenna pattern or beam 105. However in other scenarios, the associated antenna system can include multiple high gain directional antennas, each capable of forming an antenna beam 105 aligned in different boresight directions. It may be noted that in scenarios where a plurality of directional antennas are provided as part of an antenna system 104, such directional antennas can be separated by a relatively small distance (e.g. 0.5 meters to 1 meter). Such an arrangement can facilitate multiple directional antennas on a single antenna tower. Still, it will be appreciated that such directional antennas may be spaced apart by hundreds of wavelengths when the operating frequency is in the millimeter wave range.

A central communication server 108 can coordinate the operation of the communication network 100. In some scenarios, the central communication server 108 can exercise control over the one or more of the BSNs. For example, such coordination and control can be facilitate by means of a data network 120. The central communication server 108 can also facilitate backhaul services (e.g., backhaul services to a telephone network or central switching facility). The backhaul services can be provided by means of a backhaul data channel 110 which may be comprised of a wired, wireless and/or optical data link.

In some scenarios, a mobile UE node 118 may arrive in the operating area of the communication network 100 after the operation of the network has already been established. The UE node 118 is similar to the UE nodes 106 except that UE node 118 has not yet established a radio communication link with one or more of the BSNs 102. In such a scenario, it can be challenging to establish a link between the UE 118 and a BSN 102 since the UE 118 may not be aligned with a boresight direction of any of the directional antennas. Such a scenario is shown in FIG. 1. Under these circumstances, signals transmitted (and received) by UE 118 will not benefit from the directional antenna gain facilitated by one or more of the antenna beams 105. Therefore no radio link is established, even though a radio link is possible.

It will be appreciated that there are many well-known techniques for automatically establishing a radio communication link with a mobile network node, provided that path loss and other factors permit the physical layer of the link to be established. Such link establishment methods are beyond the scope of this disclosure and therefore will not be discussed in detail. For purposes of describing the present solution, it is sufficient to note that if a BSN 102 was aware of the presence and location of the UE 118 it could steer an antenna beam 105 toward the location of the UE 118 to facilitate the link establishment.

Figure 2:
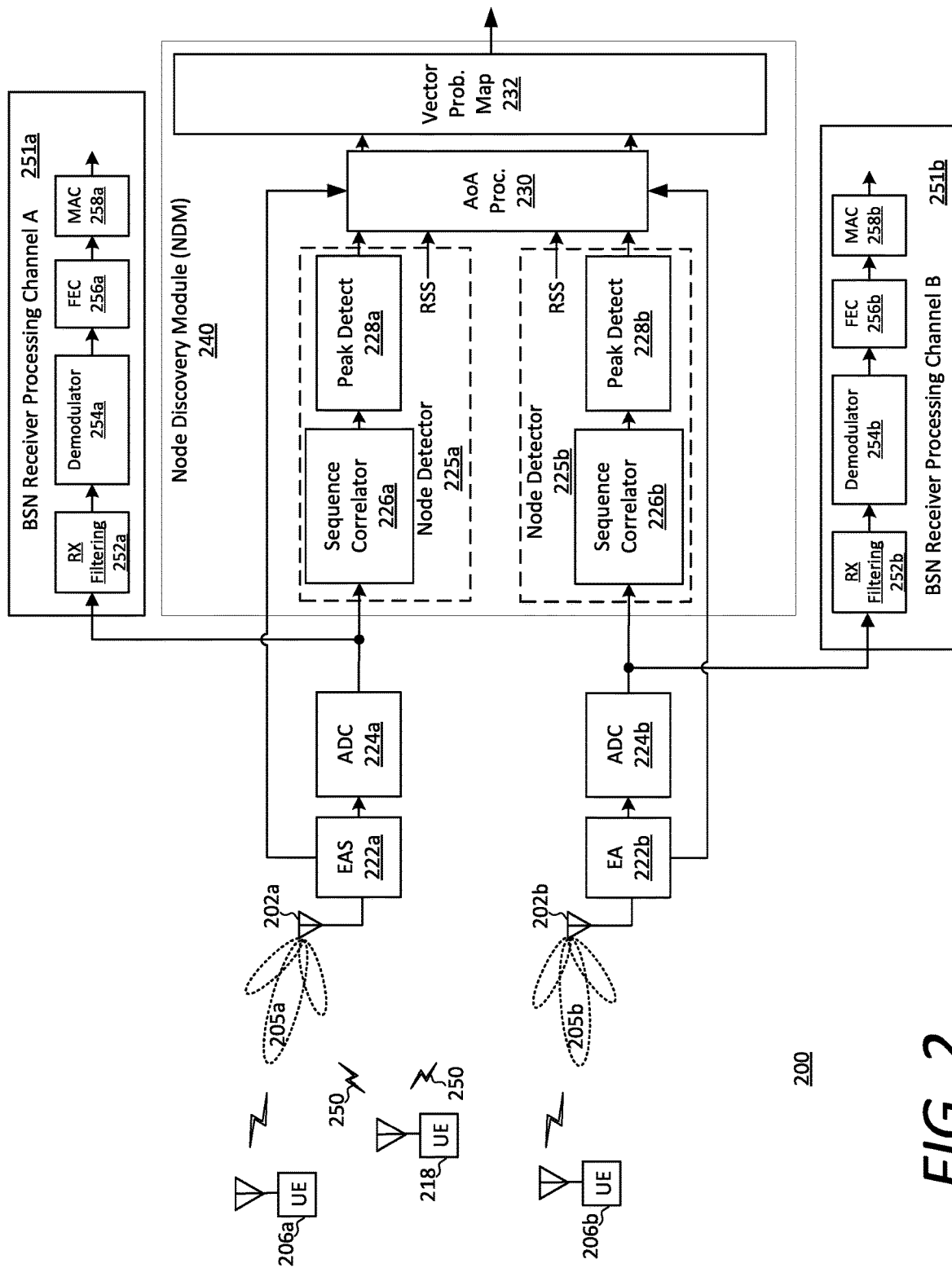
FIG. 2 is a block diagram that is useful for understanding a node discovery module which determines a vector antenna bearing to a late entrant node in a radio communication network.

Illustrated in FIG. 2 is a block diagram showing certain processing elements which can be used to facilitate determination of the presence and location of a UE 218 which is a late entrant to a radio communication network. The radio communication network can be similar to the network 100 described herein. In some scenarios, the processing elements shown in FIG. 2 can be included as part of a BSN. As explained with reference to FIG. 1, an antenna system for a particular BSN can be comprised of two or more directional antennas, each capable of forming an antenna beam for communicating with UEs. Such a scenario is illustrated in FIG. 2 wherein directional antennas 202a, 202b respectively form antenna beams 205a, 205b for communicating with UEs 206a, 206b The exact configuration of the directional antennas 202a, 202b is not critical provided that the directional beam can be selectively steered in desired direction in response to antenna beam control signals. According to one aspect, each of the directional antennas 202a, 202b can comprise a phased array antenna system in which an antenna beam or pattern is formed by a plurality of antenna elements (not shown). As is known, a boresight direction of the antenna beam formed by a phased array antenna system can be steered in different directions by selectively controlling the phase and gain of signals associated with each of the plurality of antenna elements. In the example shown in FIG. 2, the components which facilitate such beam steering are collectively indicated as electronic antenna steering (EAS) systems 222a, 222b. Electronically steered phased array antenna systems are well-known in the art and therefore will not be described here in detail. However, it will be appreciated that control signals applied to the EAS systems 222a, 222b can be used to selectively control a boresight direction for each antenna beam 205a, 205.

Each directional antenna 202a, 202b can be respectively associated with a different BSN receiver processing channel 251a, 251b. As such, a first communication session with UE 206a can be facilitated by BSN receiver processing channel A and a second communication session with UE 206b can be facilitate by BSN receiver processing channel B. For purposes of the present disclosure, the particular architecture of the BSN receiver processing channels A and B is not critical, provided that each is capable of facilitating radio communications with one or more of the mobile nodes or UEs comprising the network 200. According to one aspect, each processing channel can comprise conventional processing elements including receiver filtering 252a, 252b, demodulator 254a, 254b, forward error correction (FEC) block 256a, 256b and media access control blocks 258a, 258b. Signal processing elements for carrying out such conventional receive operations are well-known in the art and therefore will not be described here in detail.

In some scenarios, each of the BSN receiver processing channels A and B can comprise a digital architecture in which conventional signal processing operations for communicating with nodes are performed in the digital domain. The details of these receiver processing channels are beyond the scope of this disclosure. However, it will be appreciated that an analog to digital converter (ADC) 224a, 224b can facilitate the necessary conversion operation of received signals from analog to digital format. The digitized signals can then be communicated from the ADCs 224a, 224b to a respective BSN receiver processing channel to facilitate ongoing communications with UE nodes 206a, 206b.

The output of the ADCs 224a, 224b can also be provided to a node discovery module (NDM) 240. For those nodes 218 that are late entrants to the network 200, the NDM 240 facilitates detection and determination of antenna vectors necessary to facilitate radio link establishment with such nodes. The functions and processes associated with the NDM 240 are described below in greater detail with reference to FIGS. 3 and 4.

Briefly, the solution facilitated by the NDM 240 involves a combination of a high correlation gain sequence and time of arrival analysis. This approach allows late entrant node detection (and determination of antenna vectors for such nodes) using only signals received from directional antennas which are concurrently engaged in ongoing communication sessions with other nodes comprising the network. This approach offers several advantages in scenarios involving operating frequencies (e.g., millimeter wave frequencies) which exhibit high path loss.

Figure 3A:
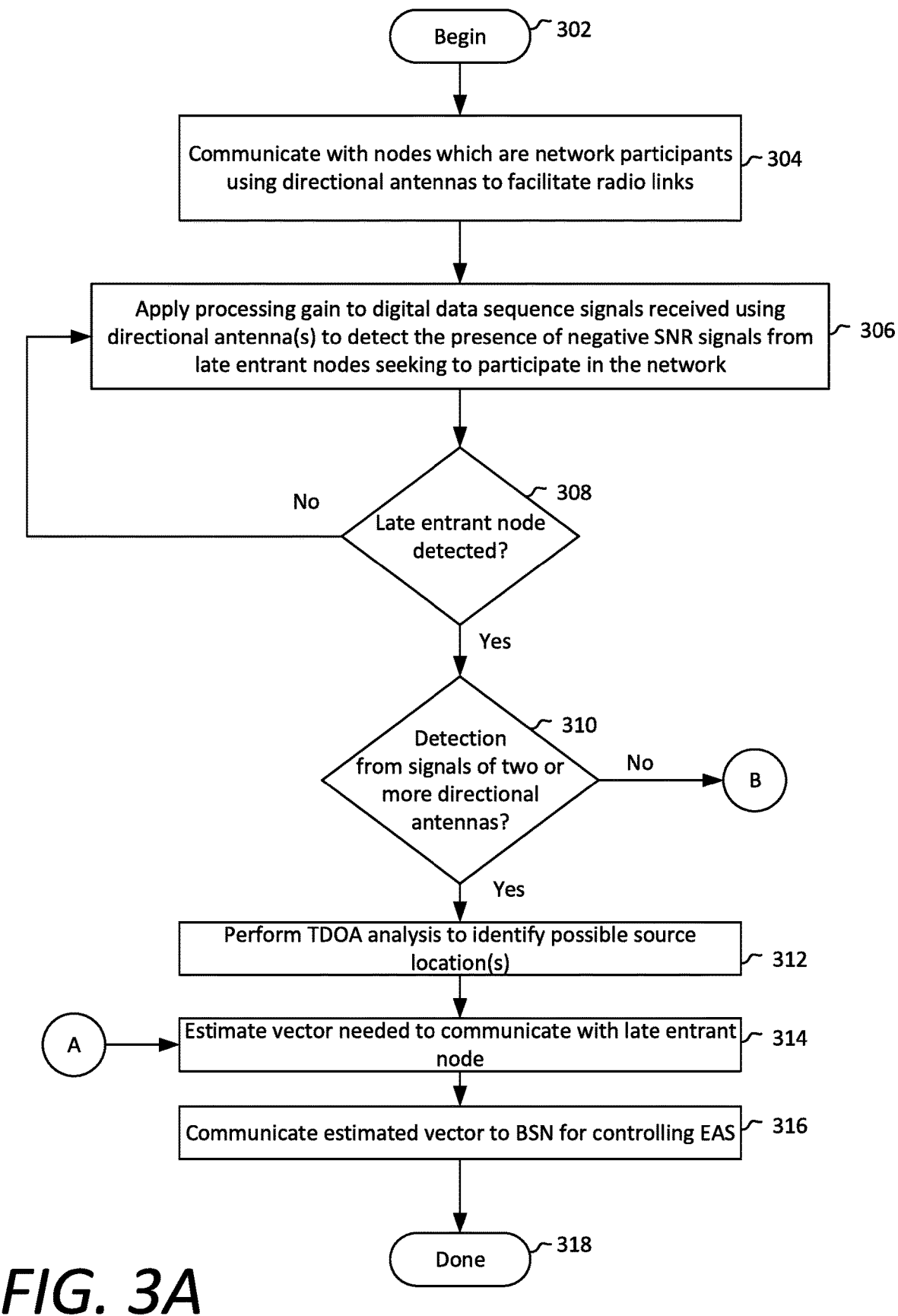
FIGS. 3A and 3B (collectively FIG. 3) together comprise a flow chart that is useful for understanding a process to determine a vector antenna bearing to a late entrant node in a radio communication network.
Figure 3B:
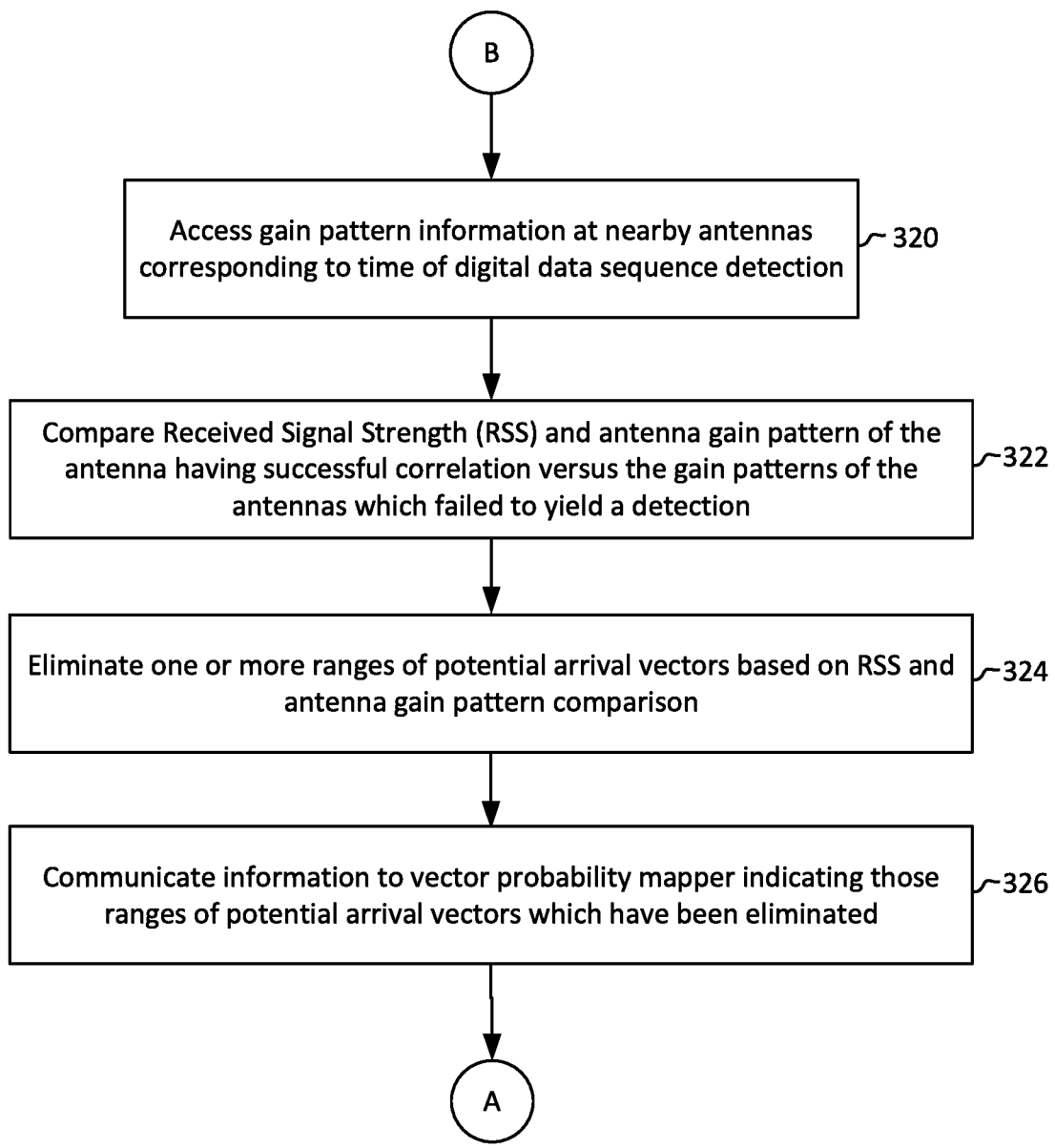

A flowchart is provided in FIG. 3 which is useful for understanding a method for detection of late entrant nodes. The flowchart begins at 302 and continues at 304 which references ongoing communications between one or more BSNs and a plurality of network participant nodes. In scenarios involving use of RF signals which experience high path loss, the BSNs will use directional antennas (e.g., electronically steered phased array directional antennas) to communicate with mobile UE nodes. Such directional antennas can be configured for high gain and relatively narrow beam-width to overcome the effects of the high path loss. According to one aspect of the solution presented herein, detection of late entrant nodes can occur concurrent with ongoing communications 304 between one or more of the BSNs and UE nodes participating in the network. But detection of signals from late entrant nodes indicating their presence can be challenging when they are outside a main lobe of the directional antenna beam.

According to one aspect, a late entrant UE node 218 which seeks to join radio communication network 200 will transmit a digital data sequence 250 with very low spectral efficiency (relatively wide bandwidth). Processing gain can be applied at 306 to facilitate detection of such digital data sequence at negative signal to noise ratios (SNRs). For example, such processing gain can be applied at NDM 240. As is known, processing gain is realized when a code alignment is achieved between a received predetermined digital data sequence (e.g., a digital data sequence 250 received from the UE node 218) and a known or stored version of the same digital sequence. Accordingly, NDM 240 can utilize a combination of a sequence correlator 226a, 226b and a peak detector 228a, 228b in node detectors 225a, 225b to facilitate detection of signals from late entrant nodes. Correlative processing methods are well-known in the art and therefore will not be described here in detail. However, it will be appreciated that with such an arrangement as described peak detector(s) 228a, 228b will generate a peak output signal which will serve as a timing indicator specifying an arrival time of the digital data sequence As explained below, this arrival time can be used for comparison purposes to ultimately determine an arrival vector for the received signal in each antenna.

The processing gain achieved by the correlative methods described herein can facilitate detection of signals from a late entrant node 218 even though such signals are initially below the noise floor in the receiver. This condition, where signals exist below the noise floor of a receiver, is sometimes referred to as negative SNR. And such condition may frequently occur in a system as described herein when a late entrant UE 218 is not aligned with the main lobe of the receiving antenna. Such negative SNR conditions are particularly likely when the RF frequencies in use (e.g., millimeter wave frequencies) are subject to a high degree of path loss. Accordingly, the correlation operation described herein enables detection of late entrant nodes outside of the main lobe of the directional antenna.

At 308 a determination can be made as to whether a digital data sequence from a late entrant node has been detected. If not (308: No) the NDM 240 can continue to monitor for the presence of such digital data sequence at 306. However, if the presence of the predetermined digital data sequence is detected in at least one received signal (308: Yes) then the process continues on to 310.

The simple fact of detection of the presence of a signal from a late entrant node by itself may not provide sufficient information to allow a BSN to steer a beam 205a, 205b to form a communication link a communication link with such node. Accordingly, the process continues at 310 to determine a particular technique by which the vector estimation process will proceed. More particularly, the process at 310 can involve a determination as to whether the presence of the predetermined digital data sequence has been detected in received signals originating from two or more of the directional antennas. If so (310: Yes), then the process continues on to 312 for determining a beam steering vector for the late entrant node using a time difference of arrival (TDOA) analysis.

More particularly, at 312 the timing of the sequence detection which occurs in a node detector (e.g., node detector 225a) will be compared to the timing of similar detections which may occur at one or more other node detectors (e.g., node detector 225b) associated with a different directional antennas. The timing information is evaluated in AOA processor 230. The AOA processor can compare an arrival time of the digital sequence at the receiving antennas (e.g. at antennas 202a, 202b) and then used this information to calculate or look-up an estimated location of a source of the signal comprising the digital data sequence 250.

TDOA analysis is well-known in the art and therefore will not be described here in detail. However, it will be appreciated that this technique requires only the time a transmitted signal was received at two or more locations, and the speed that the signal travels. The free-space speed at which radio signals travel is well-known and therefore the difference in arrival time can be used to calculate possible locations of a transmitter. Once the signal has been received at two known locations, the difference in arrival time can be used to calculate the difference in distances between the transmitter and each of the two reference points. Nonlinear regression can then be used to calculate a hyperbola of possible points where the transmitter can be located. After a sufficient number of such hyperbolas have been calculated, the position of the transmitter (i.e., the late entrant node) can be calculated based on the intersection points of such hyperbolas. An angle of arrival for the signals can then be determined for a particular BSN antenna based on the geographic location of the BSN's receiving antenna and the estimated location of the transmitter corresponding to the late entrant node.

One or more angle of arrival estimates of a late entrant node 218 can be communicated from the AOA processor to a vector probability mapper (VPM) 232. For example, an arrival angle estimate can be communicated on each occasion that the predetermined digital data sequence is detected at by node detectors 225a, 225b. At 314, the VPM 232 can use the estimated arrival angle estimate to determine a best estimate for a beam steering vector which is necessary to steer a beam (e.g. beam 205a) toward a late entrant node 218. Thereafter, at 316 the occurrence of the detection of the late entrant node and the associated beam steering vector information can be provided to a BSN. Having been made aware of the existence and location of the late entrant node seeking to join the network the BSN at an appropriate time will control its directional antenna so its boresight direction is towards the late entrant node. With the directional antenna so configured, a communication link can be effectively formed with the late entrant node due to the increased gain offered by the directional antenna. The process can then terminate at 318 or can continue with other processing.

In the scenario shown in FIG. 2, the TDOA analysis is performed based on signals received at antennas 202a, 202b which are located at the same antenna site, but located a relatively small distance apart (e.g. 1 meter to 10 meters). Such distances can be sufficient (at least in the millimeter wave context) to facilitate the type of TDOA analysis performed by an AOA processor 230 as described herein. In such scenarios, it can be convenient to provide the NDM 240 at the same location as the BSN. For example, the NDM can be collocated with the BSN at a particular antenna site. In some scenarios, the NDM functionality can be integrated with the functionality of the BSN as part of a single computer system. However, other arrangements are also possible and the NDM 240 can comprise a separate processing system.

In other scenarios, the TDOA analysis can be performed based on signals received at antennas at different antenna sites such that they are separated by relatively large distances (e.g. greater than 1 kilometer apart). In such scenarios, it can be convenient to provide one or more components associated with the NDM 240 at a location associated with a central communication server (e.g. central communication server 108). For example, it may be convenient to implement at least the AOA processor 230 and the VPM 232 using AOA processing facilities 122 at the central communication server.

Still, it can be advantageous for certain functionality (e.g., functionality associated with the node detector(s) 225a, 225b) to remain at the location of the BSN receiving node. For example, in one embodiment node detectors similar to those shown in FIG. 2 (but located at different antenna sites) can each determine time of arrival information for a transmitted digital data sequence. A highly accurate clock provided at each node detector can be used to determine a precise time when a particular digital data sequence has been received at a particular BSN. This time of arrival information can then be communicated by means of a data network (e.g., data network 120) to a central location (e.g., central communication server 108) for TDOA analysis, AOA estimation, and determination of a suitable steering vector. In such scenarios the functionality of the AOA processor 230 and VPM 232 can be provided at the central location.

According to one aspect, the functions associated with the AOA processor and VPM can be integrated with the central communication server as part of a single computer system. However, other arrangements are also possible and a separate processing system can be provided in communication with the central communication server to facilitate the TDOA and steering vector estimation.

In the solution disclosed herein, directional antennas are used to detect and facilitate location of late entrant nodes during ongoing communications with nodes already participating in the network. The processing gain applied as part of the detection process can facilitate this process. But deep nulls in the antenna patterns of such directional antennas will inevitably result in at least some instances where the digital data sequence transmissions from a late entrant node 218 will go undetected. In other words, a late entrant node 218 can periodically rebroadcast its digital data sequence in an effort to become a participant in a particular network. But it may be expected that there will be times when the transmitted digital data sequence will be detected for an extended time only in signals received by one directional antenna associated with the network.

Accordingly, in those scenarios where detection of the digital data sequence is not detected in signals from two or more directional antennas (310: No) the process can continue on to 320-324 where received signal strength (RSS) and antenna lobe state (at the time when a detection occurs) are evaluated by the AOA processor 230. The possible inability to perform TDOA estimation on a consistent basis is at least partially overcome by comparing in the AOA 320 the antenna gain pattern of the successful correlation channel versus the gain patterns of the antennas which failed to yield a detection. By comparing at 322 such gain patterns as of the time when the successful correlation occurred in at least one channel, and further considering the RSS of the digital data sequence as measured in the successful correlation channel, it is possible in many scenarios to eliminate at 324 one or more ranges of potential arrival vectors. This information can be communicated to the VPM for purposes of estimating a steering vector to be used for communicating with a late entrant node.

Figure 4:
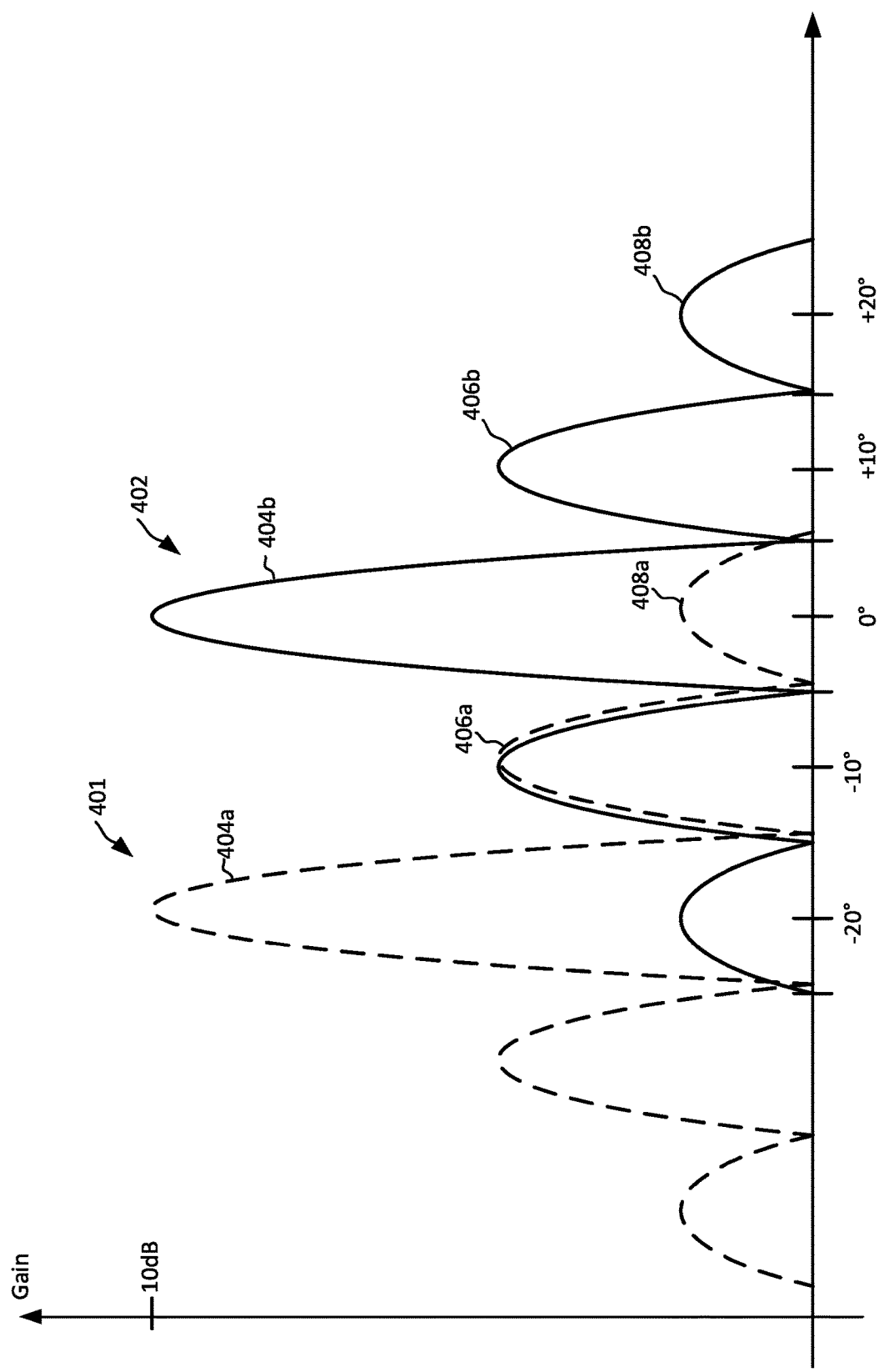
FIG. 4 is an antenna pattern overlay for a first and second directional antenna which is useful for understanding a process to determine a vector antenna bearing to a late entrant node in a radio communication network.

An example of the foregoing technique can be understood with reference to FIG. 4, which shows a first antenna pattern 401 associated with a first directional beam antenna at an antenna site, and a second antenna pattern 402 associated with a second directional beam antenna at the same antenna site. For purposes of FIG. 4, the two antennas can be thought of as being substantially co-located. To better differentiate the two patterns, the first antenna pattern 401 is shown in dotted line and the second antenna pattern 402 is shown in a solid line. It can be observed that each antenna pattern 401, 402 is comprised of a major lobe 404*a*, 404*b* and several minor lobes 406*a*, 406*b*, 408*a*, 408*b* having lesser gain.

Consider a scenario in FIG. 4 where a digital data sequence S1 is detected in a received signal associated with the first antenna pattern 401 but is not concurrently detected in the second antenna pattern 402. It can then be concluded that the angle of arrival of the detected signal S1 did not correspond to certain vector angles. For example, the angle of arrival of S1 cannot correspond to an azimuth angle where the gain of the second antenna pattern 402 is equal to or greater than the gain of the first antenna pattern 401. In the example shown in FIG. 2, this would allow us to eliminate the range from about −15° to +25° as possible candidates for the arrival angle. Further, if the RSS of the detected signal indicates that its power level is actually 6 dB above the minimum level needed to make a detection, then the arrival angle of S1 further cannot correspond to any angle where the gain of antenna pattern 402 is within 6 dB of the gain of antenna pattern 401. By using this technique various azimuth ranges can be eliminated as possible arrival angles. Each time that a range of arrival angles is eliminated, the information can be passed to the VPM 232.

In some scenarios, TDOA analysis can be used alone by the VPM for purposes of estimating a steering vector. In other scenarios, an analysis of antenna gain patterns and RSS can be used to estimate a steering vector for a late entrant node. In still other scenarios, results obtained using both techniques can be used by the VPM for purposes of estimating a steering vector to a late entrant node. In this regard it will be appreciated that the results of successful correlations can be evaluated over a plurality of digital data sequence transmission intervals to improve and refine an estimated steering vector. Once the number of possible arrival vectors associated with the digital data sequence has been reduced to a manageable set, the VPM can communicate this information to the BSN, which will begin scheduling communication attempts along the remaining hypotheses. This detection scheme runs in parallel with ongoing network communications among participating nodes and thus does not contribute to throughput loss like a dedicated scan interval would.

The systems described herein can comprise one or more components such as a processor, an application specific circuit, a programmable logic device, a digital signal processor, or other circuit programmed to perform the functions described herein. The system can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

Figure 5:
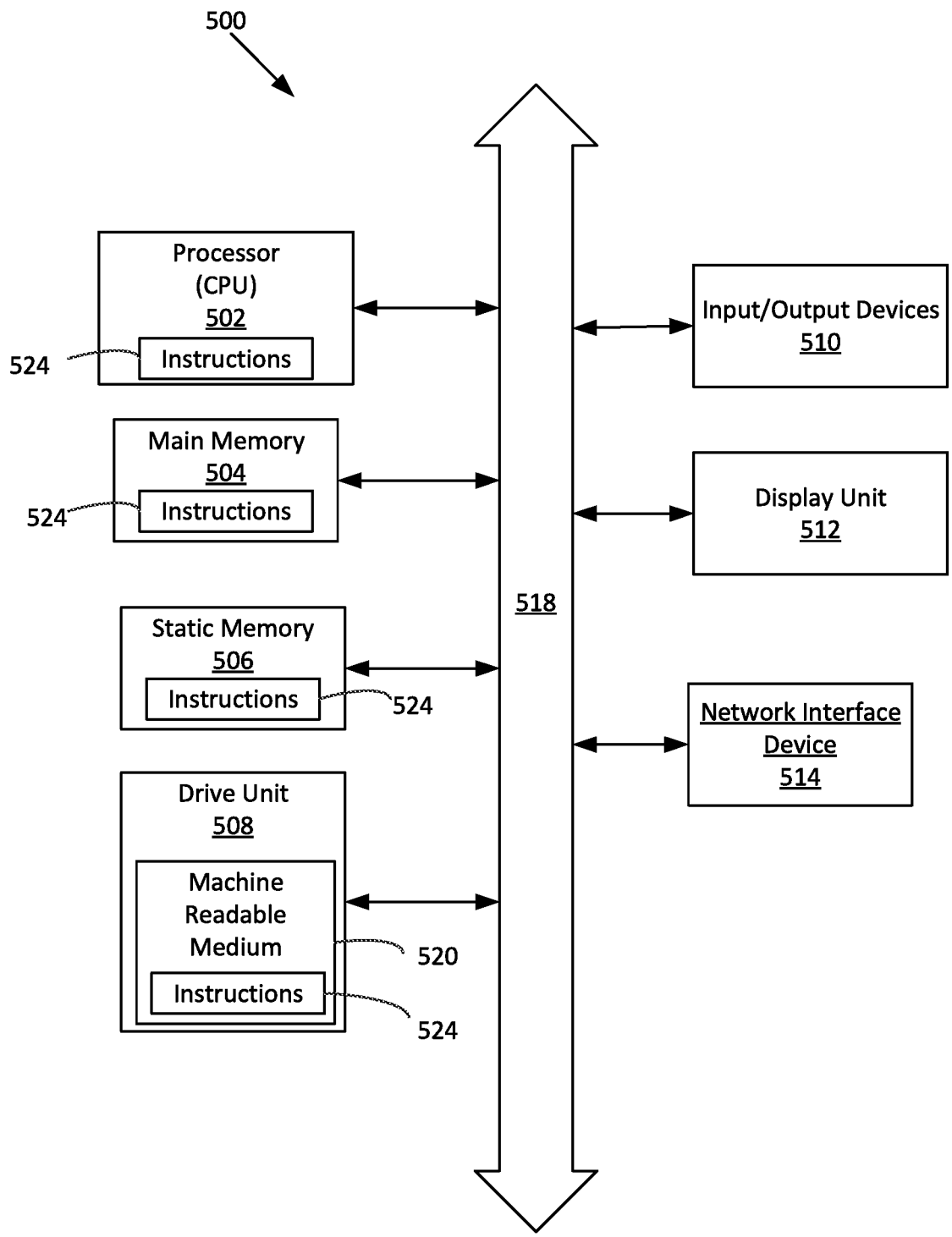
FIG. 5 is a block diagram of an exemplary computer system that can perform processing operations as described herein for purposes of implementing a node discovery module.

Referring now to FIG. 5, there is shown a hardware block diagram comprising an exemplary computer system 500. The machine can include a set of instructions which are used to cause the computer system to perform any one or more of the methodologies discussed herein. In one or more scenarios, the exemplary computer system 500 can correspond to the node discovery module 240. In some scenarios, the computer 500 can operate independently as a standalone device. However, the disclosure is not limited in this regard and in other scenarios the computer system can be operatively connected (networked) to other machines in a distributed environment to facilitate certain operations described herein. Accordingly, while only a single machine is illustrated it should be understood that in other scenarios the system can be taken to involve any collection of machines that individually or jointly execute one or more sets of instructions to facilitate the processes as described herein.

The computer system 500 is comprised of a processor 502 (e.g. a central processing unit or CPU), a main memory 504, a static memory 506, a drive unit 508 for mass data storage and comprised of machine readable media 520, input/output devices 510, a display unit 512 (e.g. a liquid crystal display (LCD), a solid state display, or a cathode ray tube (CRT)), and a network interface device 514. Communications among these various components can be facilitated by means of a data bus 518. One or more sets of instructions 524 can be stored completely or partially in one or more of the main memory 504, static memory 506, and drive unit 508. The instructions can also reside within the processor 502 during execution thereof by the computer system. The input/output devices 510 can include a keyboard, a mouse, a multi-touch surface (e.g. a touchscreen) and so on. The network interface device 514 can be comprised of hardware components and software or firmware to facilitate wired or wireless network data communications in accordance with a network communication protocol utilized by a data network 120.

The drive unit 508 can comprise a machine readable medium 520 on which is stored one or more sets of instructions 524 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 500 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with a particular implementation is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. A method for discovering the presence of a communication node which seeks participation in a radio communication network, comprising:
   using a first directional antenna associated with a first network node to facilitate a radio network communication session (RNCS) with at least a second network node;
   concurrent with the RNCS, receiving at the first directional antenna a first signal comprising a digital data sequence transmitted from a late entrant node (LEN) which seeks participation in the radio communication network;
   applying digital data processing gain to the first signal received by the first directional antenna to facilitate detection of the digital data sequence at receive signal strength levels which are below a noise floor of a receiver associated with the first network node;
   performing a time difference of arrival (TDOA) analysis if the digital data sequence transmitted from the late entrant node is also detected in a second signal contemporaneously received at a second directional antenna;
   accessing dynamically variable state information which specifies first and second antenna gain patterns for the first and second directional antennas at a time which corresponds to the detection time of the digital data sequence in at least the first signal;
   determining location information associated with the LEN based on the TDOA analysis; and
   using the location information to estimate at least one beam-steering vector necessary for electronically steering a boresight of a transmit and receive antenna beams toward the LEN.

2. The method according to claim 1, further comprising comparing the first and second antenna gain patterns to determine exclusionary arrival angles from which the first signal cannot have originated under conditions where the digital data sequence transmitted from the late entrant node is only detected in the first signal.

3. The method according to claim 2, further comprising using a received signal strength (RSS) information for the first signal to facilitate the determination of the exclusionary arrival angles in accordance with the first and second antenna gain patterns.

4. The method according to claim 2, further comprising using the exclusionary arrival angles and the location information to estimate the at least one beam-steering vector.

5. The method according to claim 4, further comprising repeating for subsequent transmissions of the digital data sequence at least one of the TDOA analysis, and the comparing of first and second antenna gain patterns, to refine the estimate of the at least one beam-steering vector.

6. The method according to claim 4, further comprising scheduling the occurrence of the transmit antenna beam in accordance with the at least one beam steering vector after a number of possible estimates for the beam steering vector have been reduced to less than a predetermined value.

7. The method according to claim 2, wherein the transmit antenna beam directed toward the LEN is generated by one of the first and second directional antennas.

8. The method according to claim 2, further comprising receiving the second signal at the second directional antenna concurrent with a second RNCS with a third network node, wherein the second RNCS is facilitated by the second directional antenna.

9. The method according to claim 2, wherein the first and second directional antennas are situated at the same antenna site.

10. A radio communication network, comprising:
a first network node comprising a first directional antenna configured to facilitate a radio network communication session (RNCS) with at least a second network node; and
a node discovery module (NDM) comprised of at least one electronic processing element configured to:
concurrent with the RNCS, receive from the first directional antenna a first signal comprising a digital data sequence transmitted from a late entrant node (LEN) which seeks participation in the radio communication network;
apply digital data processing gain to the first signal received by the first directional antenna to facilitate detection of the digital data sequence at receive signal strength levels which are below a noise floor of a receiver associated with the first network node;
perform a time difference of arrival (TDOA) analysis if the digital data sequence transmitted from the late entrant node is also detected in a second signal contemporaneously received at a second directional antenna;
access dynamically variable state information which specifies first and second antenna gain patterns for the first and second directional antennas at a time which corresponds to the detection time of the digital data sequence in at least the first signal;
determine location information associated with the LEN based on the TDOA analysis; and
use the location information to estimate at least one beam-steering vector necessary for electronically steering a boresight of a transmit and receive antenna beams toward the LEN.

11. The radio communication network according to claim 10, wherein the NDM is further configured to compare the first and second antenna gain patterns to determine exclusionary arrival angles from which the first signal cannot have originated under conditions where the digital data sequence transmitted from the late entrant node is only detected in the first signal.

12. The radio communication network according to claim 11, wherein the NDM is further configured to use a received signal strength (RSS) information for the first signal to facilitate the determination of the exclusionary arrival angles in accordance with the first and second antenna gain patterns.

13. The radio communication network according to claim 11, wherein the NDM is further configured to use the exclusionary arrival angles and the location information to estimate the at least one beam-steering vector.

14. The radio communication network according to claim 13, wherein the NDM is further configured to repeat for subsequent transmissions of the digital data sequence at least one of the TDOA analysis, and the comparing of first and second antenna gain patterns, to refine the estimate of the at least one beam-steering vector.

15. The radio communication network according to claim 13, wherein the NDM is further configured to trigger an occurrence of the transmit antenna beam in accordance with the at least one beam steering vector after a number of possible estimates for the beam steering vector have been reduced to less than a predetermined value.

16. The radio communication network according to claim 11, wherein the transmit antenna beam directed toward the LEN is generated by one of the first and second directional antennas.

17. The radio communication network according to claim 11, wherein the NDM is further configured to receive the second signal from the second directional antenna concurrent with an occurrence of a second RNCS with a third network node, wherein the second RNCS is facilitated by the second directional antenna.

18. The radio communication network according to claim 11, wherein the first and second directional antennas are situated at the same antenna site.

* * * * *